(12) United States Patent
Harel et al.

(10) Patent No.: US 11,611,817 B2
(45) Date of Patent: Mar. 21, 2023

(54) TIME DIVISION MULTIPLEXING AND WAVELENGTH DIVISION MULTIPLEXING HYBRID DISTRIBUTION COMPONENT AND SYSTEMS

(71) Applicant: CORNING RESEARCH & DEVELOPMENT CORPORATION, Corning, NY (US)

(72) Inventors: Dror Harel, Hod Hasharon (IL); Baruh Hason, Tel Aviv (IL); Pinhas Yehuda Rosenfelder, Beit-Shemesh (IL); Yair Zeev Shapira, Shoham (IL)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/471,211

(22) Filed: Sep. 10, 2021

(65) Prior Publication Data
US 2022/0086543 A1    Mar. 17, 2022

Related U.S. Application Data

(60) Provisional application No. 63/078,020, filed on Sep. 14, 2020.

(51) Int. Cl.
*H04Q 11/00*     (2006.01)
*H04J 14/02*     (2006.01)

(52) U.S. Cl.
CPC ...... *H04Q 11/0067* (2013.01); *H04J 14/0227* (2013.01); *H04Q 11/0071* (2013.01);
(Continued)

(58) Field of Classification Search
CPC .................................................. H04Q 11/0067
See application file for complete search history.

(56) References Cited

U.S. PATENT DOCUMENTS 6,351,582 B1   2/2002  Dyke et al.
6,678,442 B2   1/2004  Gall et al.
(Continued)

OTHER PUBLICATIONS

Lubomir Scholtz, et al, "Design of a novel wavelength scheme for DWDM-PON coexisting with current PON technologies and protected against signal interference", 16th International Conference on Transparent Optical Networks (ICTON), Electronic ISBN: 978-1-4799-5601-2, Jul. 2014.
(Continued)

*Primary Examiner* — Shi K Li
(74) *Attorney, Agent, or Firm* — William D. Doyle

(57) ABSTRACT

Systems and assemblies for providing both cellular and passive optical local area network (POLAN) data signals along a single, shared fiber optic backbone within an in-building network architecture are provided herein. Systems include a headend unit that combines data signals from a cellular network and optical line terminal (OLT) onto the fiber optic backbone, which is then connected to a series of daisy-chained fiber optic assembly units. An example fiber optic assembly unit includes an asymmetric coupler that splits an input fiber optic signal from the fiber optic backbone into an output fiber optic signal and a throughput fiber optic signal that is fed back onto the continuing fiber optic backbone. The output fiber optic signal is filtered into dense wavelength-division multiplexing (DWDM) channels for providing data signals to a wireless or cellular network and further split into multiple passive optical network (PON) outputs for a local area network (LAN).

21 Claims, 10 Drawing Sheets

(52) U.S. Cl.
CPC ............... *H04Q 2011/0064* (2013.01); *H04Q 2011/0086* (2013.01)

(56) References Cited

U.S. PATENT DOCUMENTS

| | | | |
|---|---|---|---|
| 9,414,137 B2 | 8/2016 | Smith et al. | |
| 9,762,322 B1 | 9/2017 | Amundson | |
| 10,541,774 B1* | 1/2020 | Dai | H04B 10/272 |
| 2003/0161637 A1* | 8/2003 | Yamamoto | H04J 14/0206 |
| | | | 398/115 |
| 2006/0245688 A1 | 11/2006 | Gall et al. | |
| 2007/0212072 A1 | 9/2007 | Iannone et al. | |
| 2008/0089684 A1 | 4/2008 | Smith et al. | |
| 2008/0298758 A1* | 12/2008 | Johnson | G02B 6/02366 |
| | | | 385/123 |
| 2015/0263810 A1 | 9/2015 | Yao et al. | |
| 2015/0365191 A1* | 12/2015 | Lee | H04J 14/0282 |
| | | | 398/67 |
| 2021/0167886 A1* | 6/2021 | Mather | H04B 10/27 |

OTHER PUBLICATIONS

Vivek Kachhatiya, et al, "Wavelength division multiplexing-dense wavelength division multiplexed passive optical network (WDM-DWDM-PON) for long reach terrain connectivity", 2016 International Conference on Communication and Signal Processing (ICCSP), Apr. 2016, pp. 5.

* cited by examiner

TIME DIVISION MULTIPLEXING AND WAVELENGTH DIVISION MULTIPLEXING HYBRID DISTRIBUTION COMPONENT AND SYSTEMS

RELATED APPLICATIONS

This application claims the benefit of priority under 35 U.S.C. § 119 of U.S. Provisional Application Ser. No. 63/078,020, filed Sep. 14, 2020, the content of which is relied upon and incorporated herein by reference in its entirety.

FIELD OF THE DISCLOSURE

Embodiments of the present disclosure relate generally to network architecture and, more particularly, to assemblies and systems for distribution of data signals within network architecture.

BACKGROUND OF THE DISCLOSURE

Within typical building communications networks (e.g., enterprise, hospitality, etc.), separate infrastructures exist for the local area network (LAN) and the cellular or wireless network. For example, the LAN may be copper-based (e.g., with CATS/CAT6 cables) and include a large number of end nodes serving multiple devices (e.g., computers, IP phones, CCTV cameras, IPTV, Wi-Fi hot spots) with latency-tolerance and varying bandwidth requirements. Downstream and upstream traffic within passive optical local area network (POLAN) architectures are optically split and combined, respectively, with each optical network terminal (ONT) node receiving data signals downstream in a continuous mode, but transmitting upstream in its own timeslot (e.g., via time-division multiplexing (TDM)) to avoid interference at the optical coupler—resulting in much lower upstream bandwidth as well as significant added latency. To avoid this TDM latency in POLAN architectures and meet the high-bitrate upstream and downstream link requirements, such as with cellular traffic, a separate network (e.g., wired or wireless) within a building is provided that is independent from the POLAN. Such a separate (e.g., cellular) network may be fiber-based (e.g., point-to-point optical links in a star architecture) and supported by distributed antenna systems (DAS) carrying fronthaul or midhaul data to and from multiple remote units (e.g., converting between optical and RF signals) with high bandwidth and low latency. Currently, there are increasing demands for higher bitrates and lower latencies (e.g., due to virtual/augmented reality, 8K video, edge computing, and/or other applications) along with higher capacity and smaller coverage areas (e.g., due to an expected five-fold increase in densification of higher-frequency antenna nodes in centralized radio access network (C-RAN) architectures). Deploying more point-to-point optical fibers to meet these demands may be complex and/or expensive.

BRIEF SUMMARY OF THE DISCLOSURE

In a passive optical local area network (POLAN), active devices at the headend (e.g., optical line terminal (OLT)) connect to multiple nodes (e.g., optical network terminal (ONT)) via fiber optic feeder or distribution cables that are split into star or other architectures using passive optical splitters/couplers with no active devices in between.

Embodiments of the present disclosure provide for a converged fiber distribution system (e.g., in enterprise or hospitality buildings) that supports both local area network (LAN) and delay sensitive/high-bitrate usage applications (e.g., point-to-point optical connectivity, such as cellular traffic). In this regard, various embodiments of the present disclosure provide fiber optic assemblies and systems that cure many of the above noted defects and difficulties by combining the data signals for both networks (e.g., the LAN and cellular traffic) onto a single, shared fiber optic backbone. Thus, various embodiments of the disclosed systems and assemblies may provide the cellular network with high bandwidth and lower latencies while being deployable at lower material and installation costs. Further, the disclosed assemblies may be combined into cabinets, housings, and/or other enclosures allowing for a decreased footprint—thereby offering the versatility of both POLAN and point-to-point optical connectivity without requiring additional space. Moreover, the disclosed assemblies may be configured into standard building block units enabling customization of network architectures to solve various customers' connectivity needs.

In an example embodiment, a system is provided. The system includes a headend unit configured to combine inputs into a single fiber optic backbone. The headend unit includes at least one optical line terminal (OLT) port, one or more dense wavelength-division multiplexing (DWDM) ports, and a multiplexer. The system further includes a plurality of fiber optic assembly units that are connected in series by the fiber optic backbone. At least one of plurality of fiber optic assembly units includes an asymmetric coupler configured to split an input fiber optic signal into a throughput fiber optic signal and an output fiber optic signal. The throughput fiber optic signal from the one of the plurality of fiber optic assembly units is routed as the input fiber optic signal to a next one of the plurality of fiber optic assembly units in the series via the fiber optic backbone.

In some embodiments, the at least one of the plurality of fiber optic assembly units further includes a DWDM filter configured to filter a channel for a network from the output fiber optic signal. In some embodiments, the at least one of the plurality of fiber optic assembly units further includes a splitter configured to split a wideband signal from the output fiber optic signal into a plurality of passive optical network (PON) outputs for a second network. In some embodiments, the at least one of the plurality of fiber optic assembly units further includes a second DWDM filter configured to filter a second channel for the network from the output fiber optic signal.

In some embodiments, the asymmetric coupler of a first of the plurality of fiber optic assembly units in the series has a coupling ratio within a range of 90:10 to 50:50.

In another example embodiment, a system is provided. The system comprises a plurality of fiber optic assembly units connected in series by a fiber optic backbone. At least one of the plurality of fiber optic assembly units includes an asymmetric coupler configured to split an input fiber optic signal into a throughput fiber optic signal and an output fiber optic signal, a dense wavelength-division multiplexing (DWDM) filter configured to filter a channel for a first network from the output fiber optic signal, and a splitter configured to split a wideband signal from the output fiber optic signal into a plurality of passive optical network (PON) outputs for a second network. The throughput fiber optic signal from the one of the plurality of fiber optic assembly units is routed as the input fiber optic signal to a next one of the plurality of fiber optic assembly units in the series via the fiber optic backbone.

In some embodiments, the at least one of the plurality of fiber optic assembly units further includes a second DWDM filter configured to filter a second channel for the first network from the output fiber optic signal. In some embodiments, the second channel for the first network from the output fiber optic signal is configured for uplink.

In some embodiments, the at least one of the plurality of fiber optic assembly units comprises an enclosure including the asymmetric coupler, the DWDM filter, the splitter, and splices.

In some embodiments, the at least one of the plurality of fiber optic assembly units further comprises preconnectorized jumpers configured to connect with active equipment.

In some embodiments, the channel for the first network from the output fiber optic signal is configured for an active wireless access device. In some embodiments, the active wireless access device is at least one of a small cell 4G transceiver, a small cell 5G transceiver, a remote radio head, or a WiFi access point. In some embodiments, the active wireless access device is configured to use at least one of a CPRI interface or an ORAN interface.

In some embodiments, the splitter is at least one of a 1×4 output splitter, a 1×8 output splitter, a 1×16 output splitter, or a 1×32 output splitter.

In some embodiments, the splitter is connected to the output fiber optic signal downstream of the DWDM filter connection to the output fiber optic signal.

In some embodiments, the system further includes a headend unit configured to combine inputs into the fiber optic backbone before connecting to a first of the plurality of fiber optic assembly units. The headend unit includes at least one optical line terminal (OLT) port, one or more DWDM ports, and a multiplexer.

In some embodiments, the system further includes an additional fiber optic assembly unit connected to the fiber optic backbone after a final of the plurality of fiber optic assembly units. The additional fiber optic assembly unit including at least one of an additional fiber optic assembly unit DWDM filter configured to filter a second channel for the first network from an input fiber optic signal; or an additional fiber optic assembly unit splitter configured to split a wideband signal from the input fiber optic signal into a plurality of passive optical network (PON) outputs for the second network.

In yet another example embodiment, a fiber optic assembly unit enabling hybrid distribution of time-division multiplexing (TDM) and wavelength-division multiplexing (WDM) is provided. The fiber optic assembly unit comprises an asymmetric coupler configured to split an input fiber optic signal into a throughput fiber optic signal and an output fiber optic signal, a dense wavelength-division multiplexing (DWDM) filter configured to filter a channel for a first network from the output fiber optic signal, and a splitter configured to split a wideband signal from the output fiber optic signal into a plurality of passive optical network (PON) outputs for a second network.

In some embodiments, the fiber optic assembly unit further comprises an enclosure including the asymmetric coupler, the DWDM filter, the splitter, and a splicing module.

In some embodiments, the fiber optic assembly unit further comprises preconnectorized jumpers configured to connect with active equipment.

In some embodiments, the splitter is connected to the output fiber optic signal downstream of the DWDM filter connection to the output fiber optic signal.

BRIEF DESCRIPTION OF THE DRAWINGS

The accompanying drawings are included to provide a further understanding and are incorporated in and constitute a part of this specification. The drawings illustrate one or more embodiments, and together with the description serve to explain principles and operation of the various embodiments.

Figure 1:
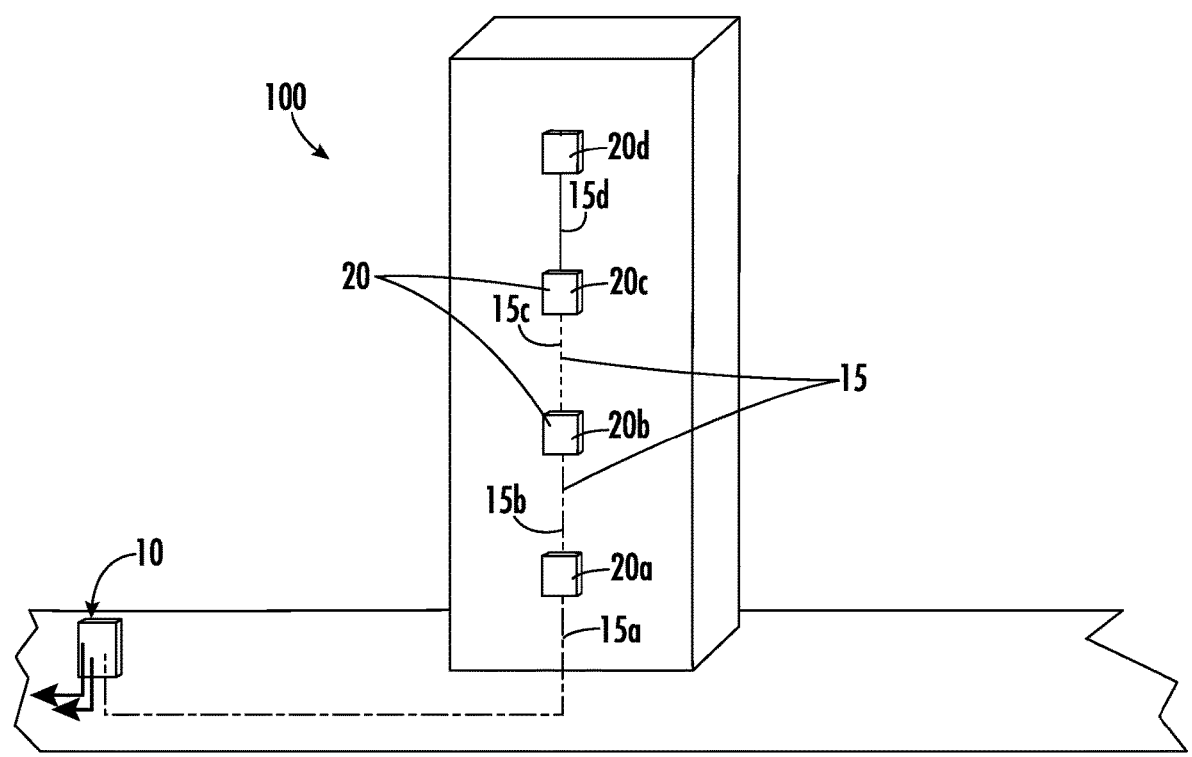
Figure 2:
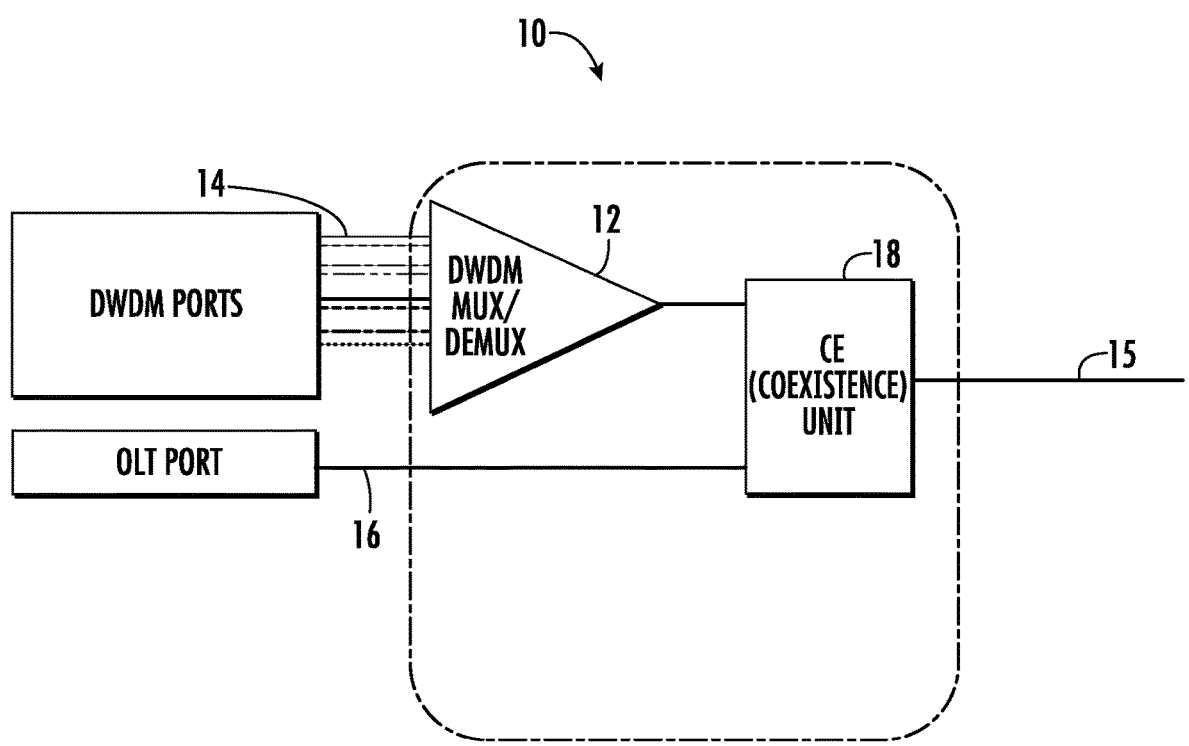
Figure 3:
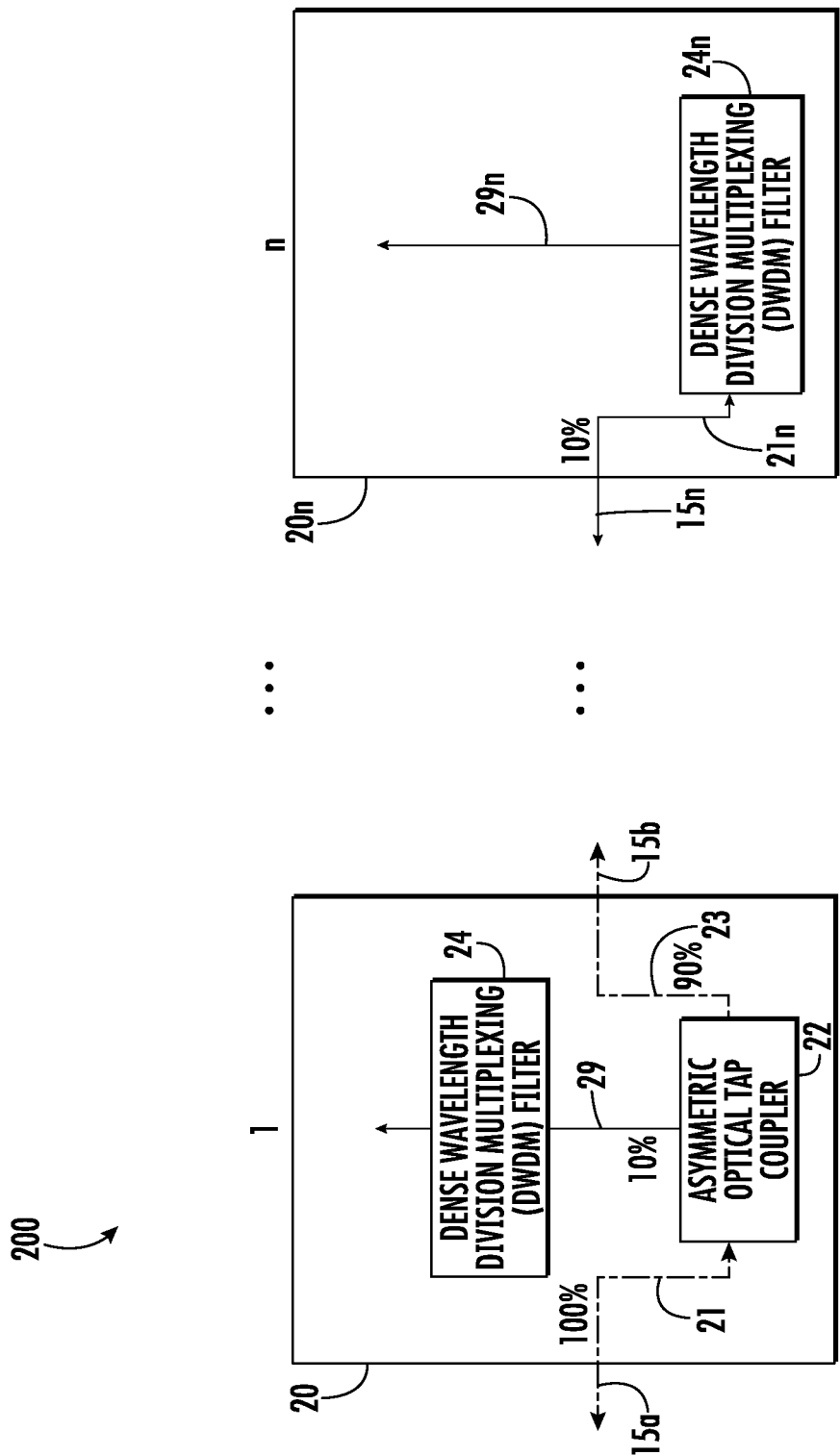
Figure 4:
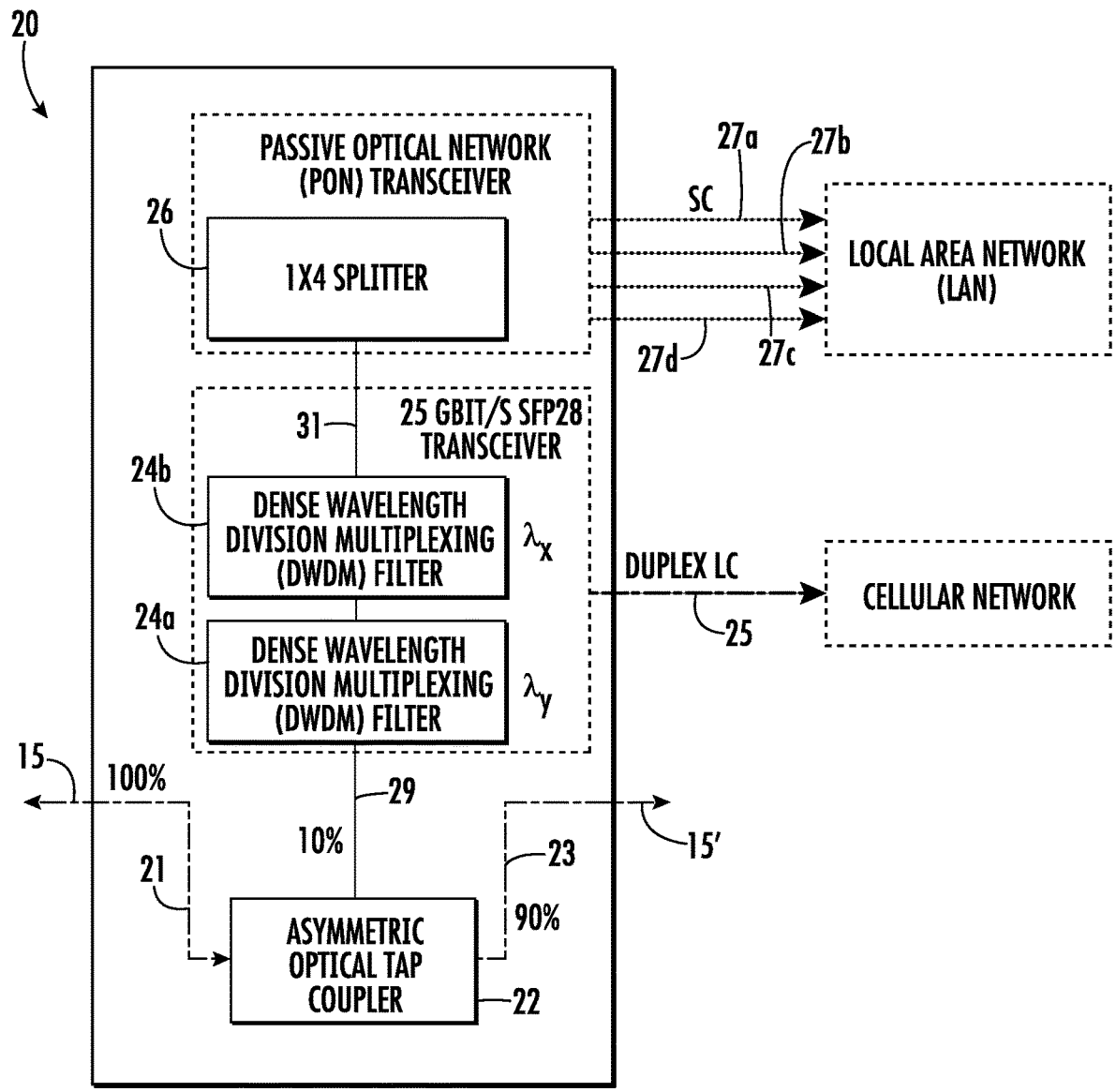
Figure 5:
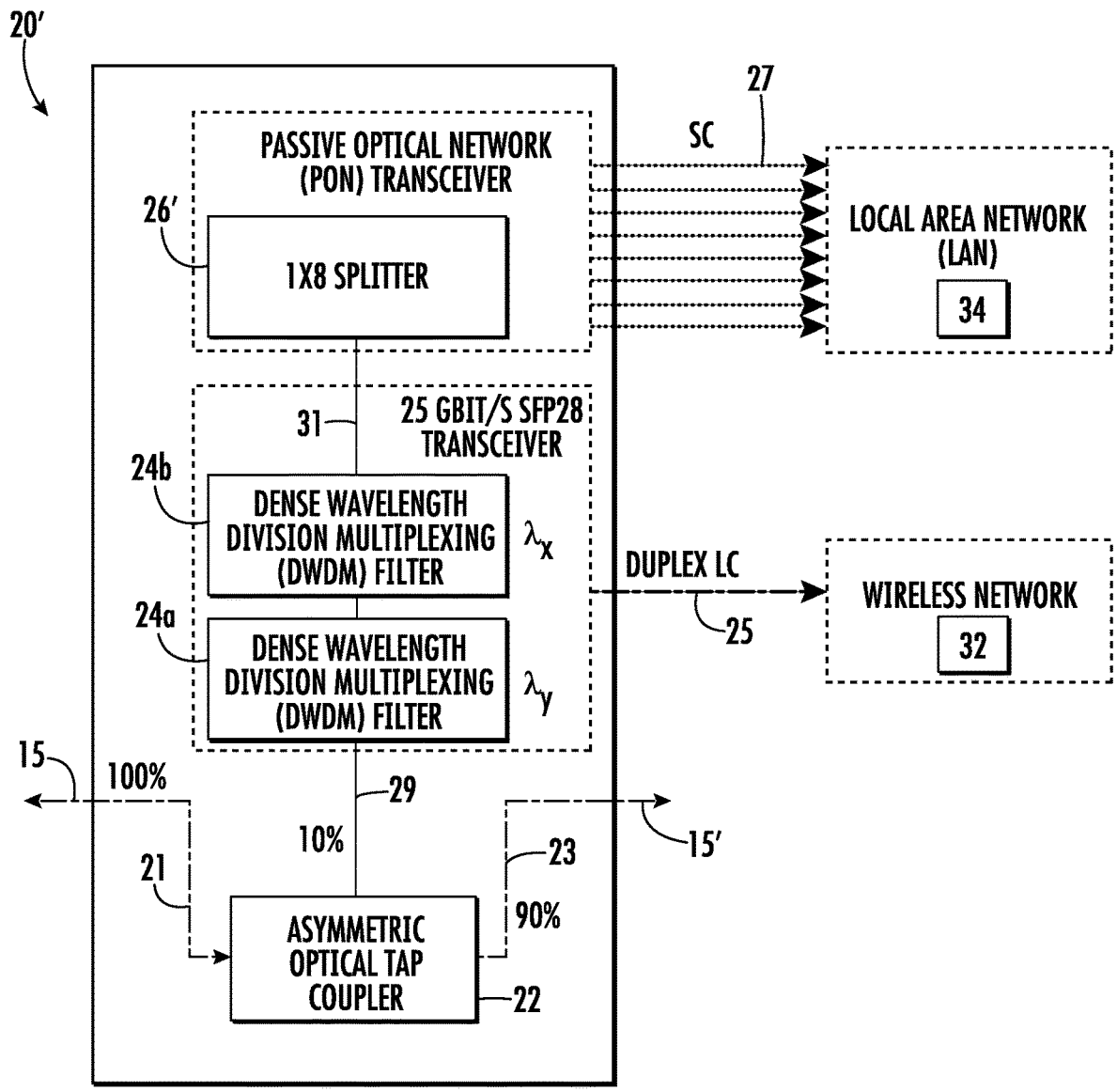
Figure 6:
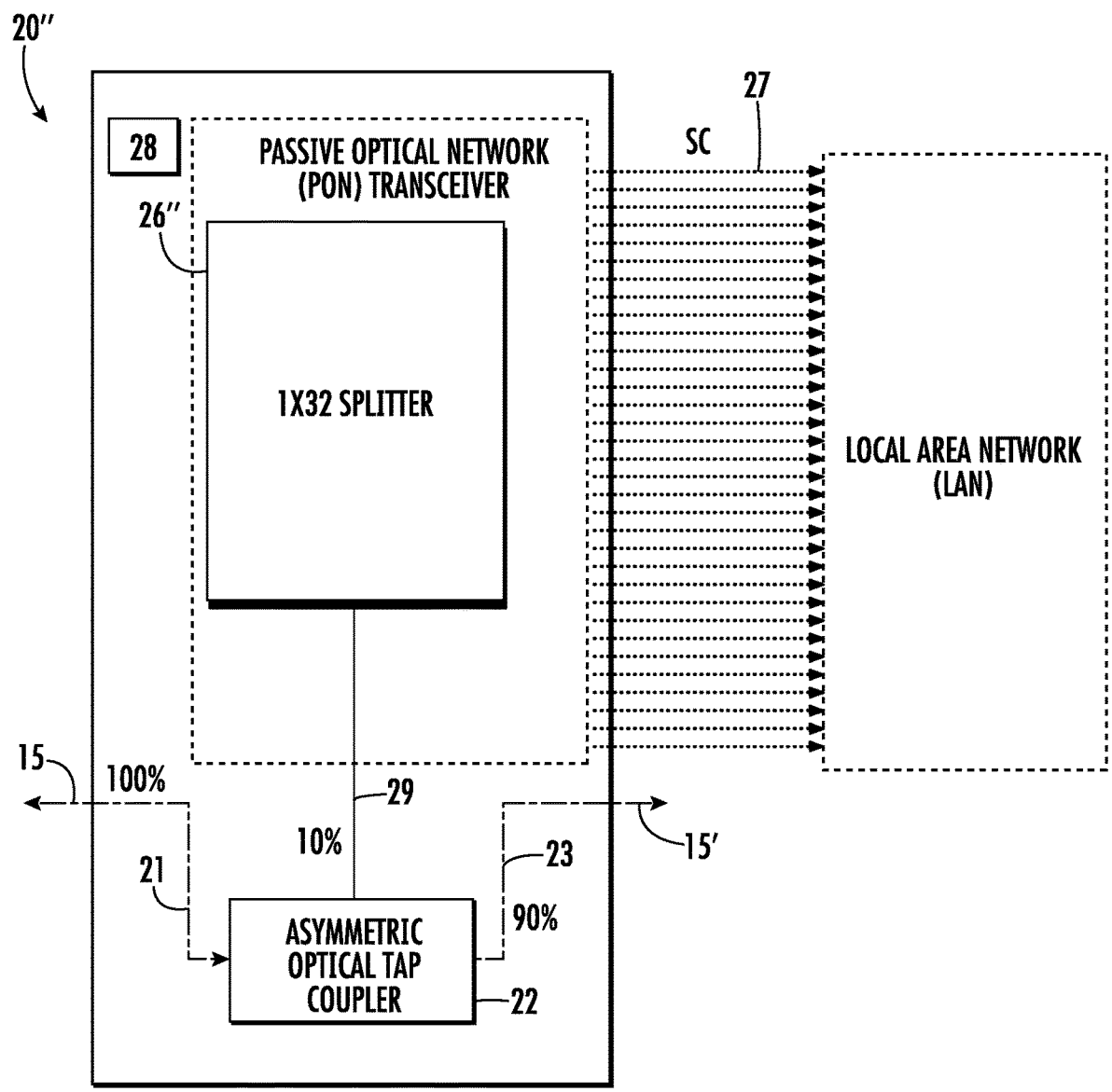
Figure 7:
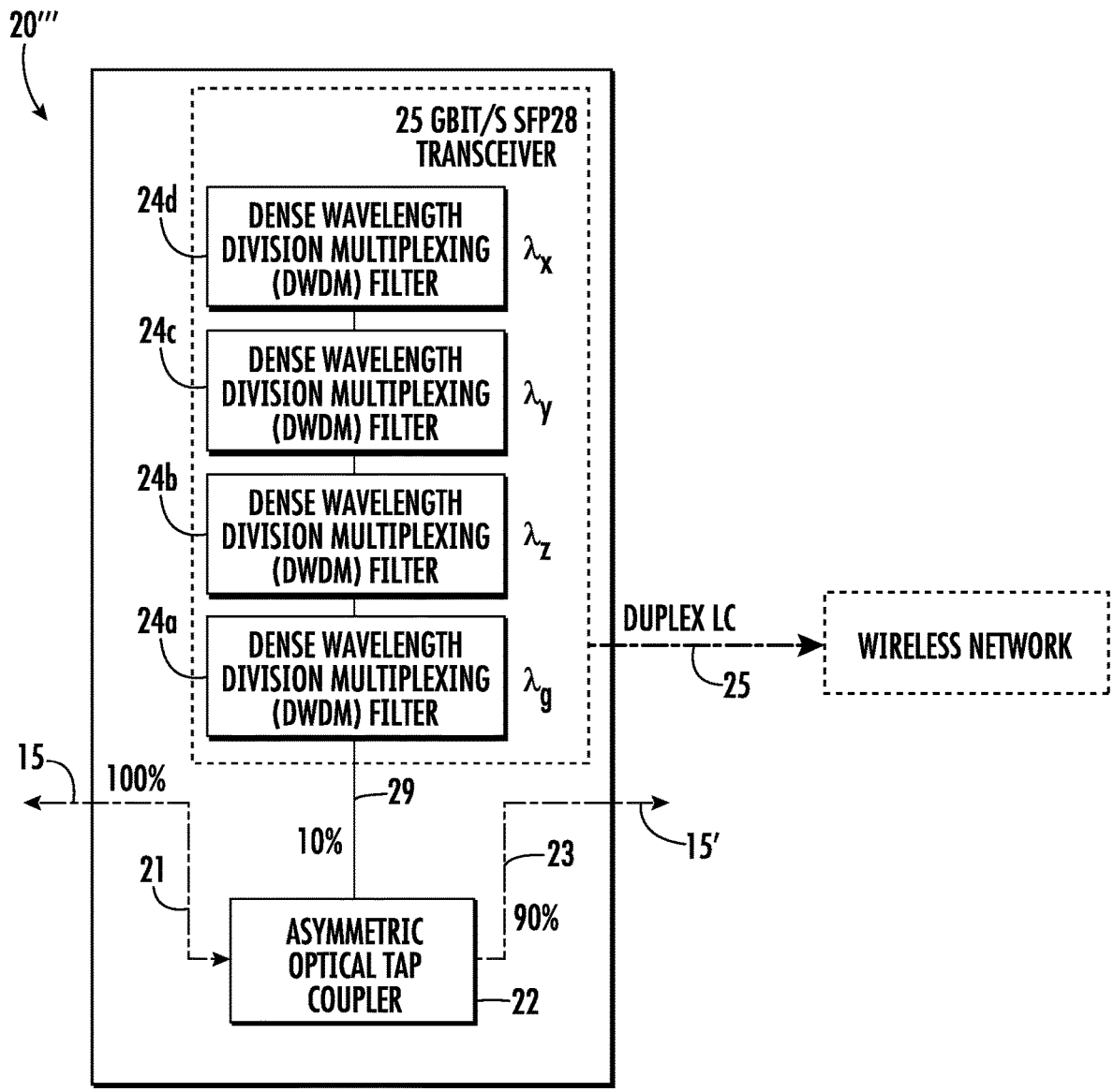
Figure 8:
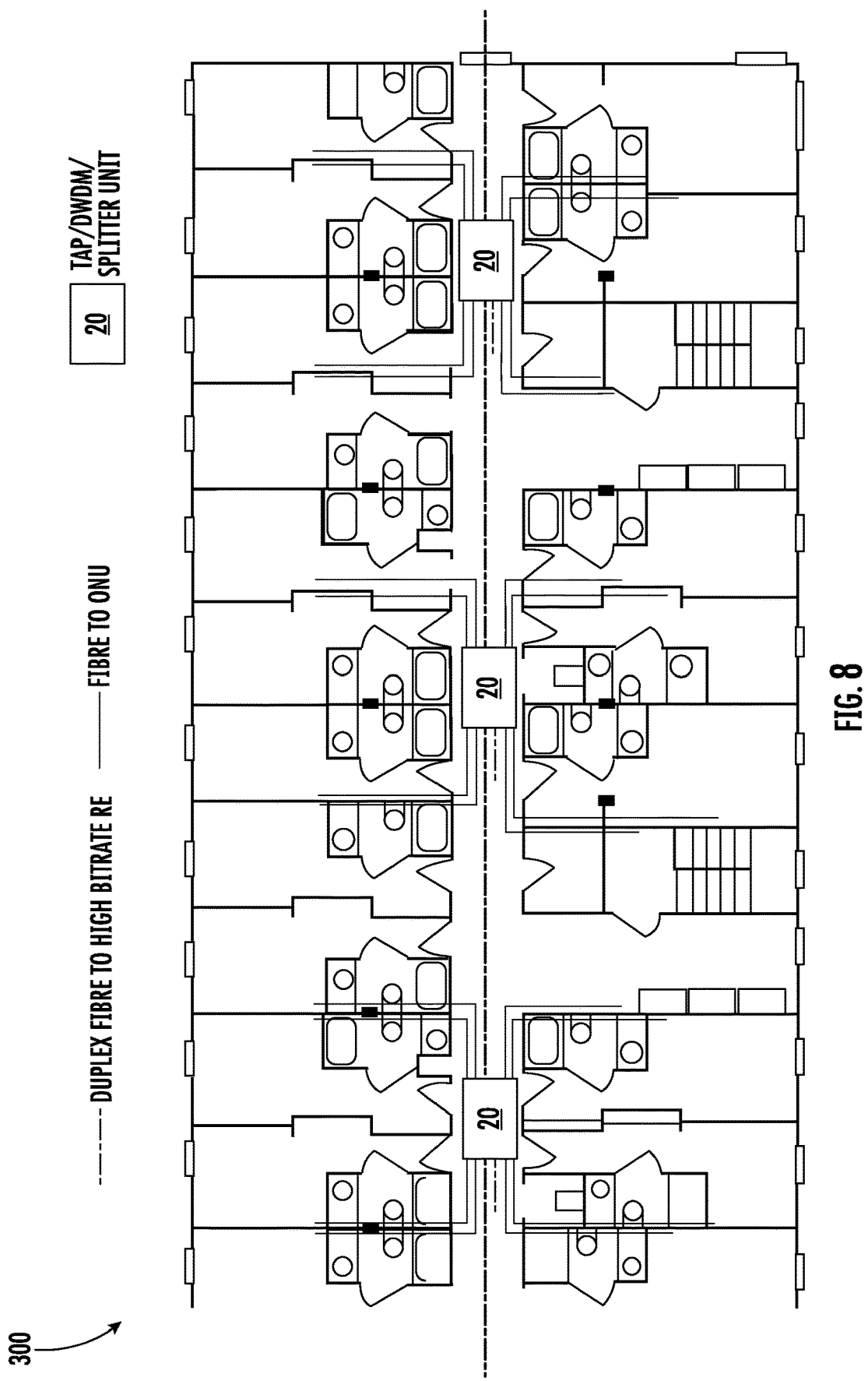
Figure 9:
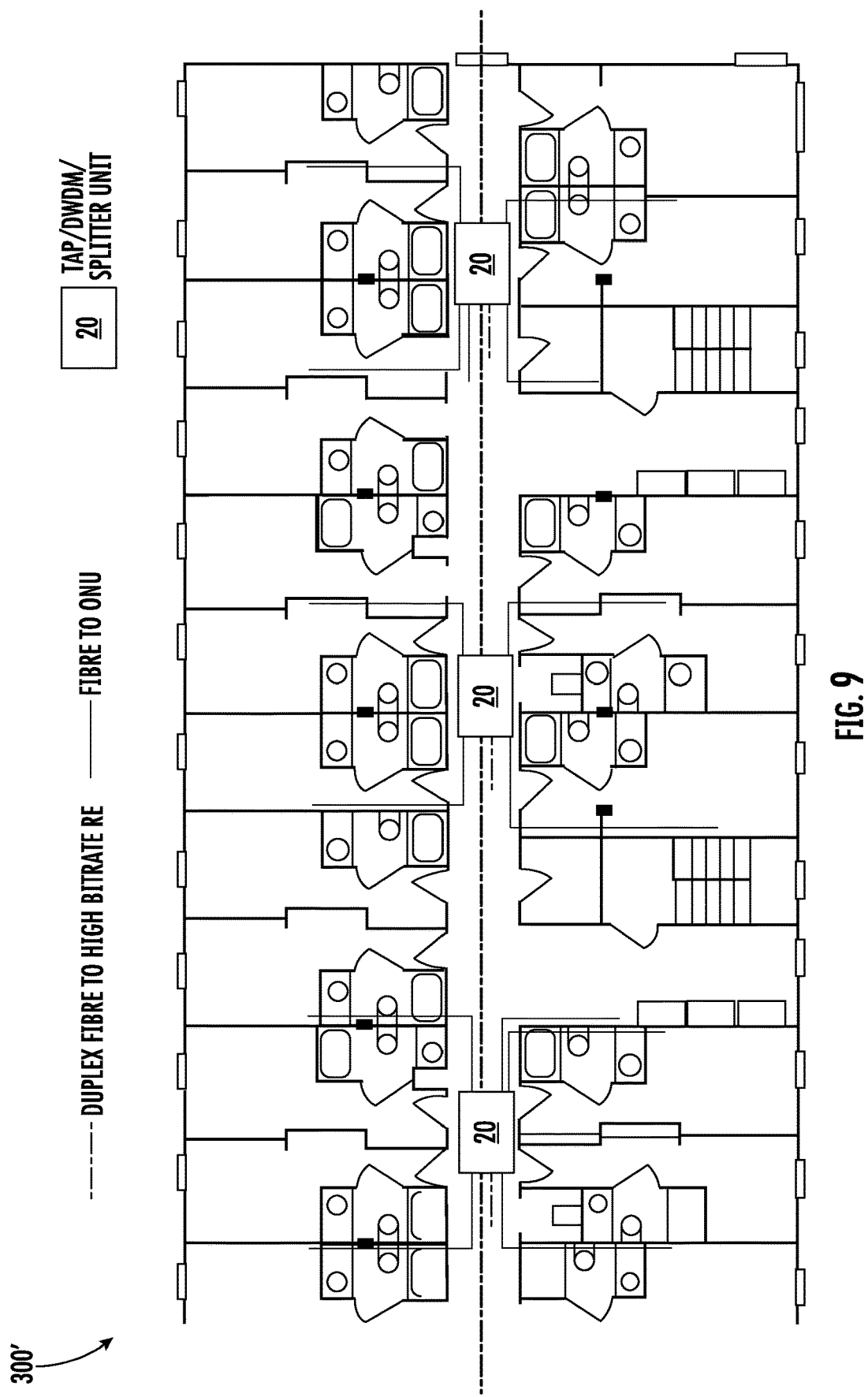
Figure 10:
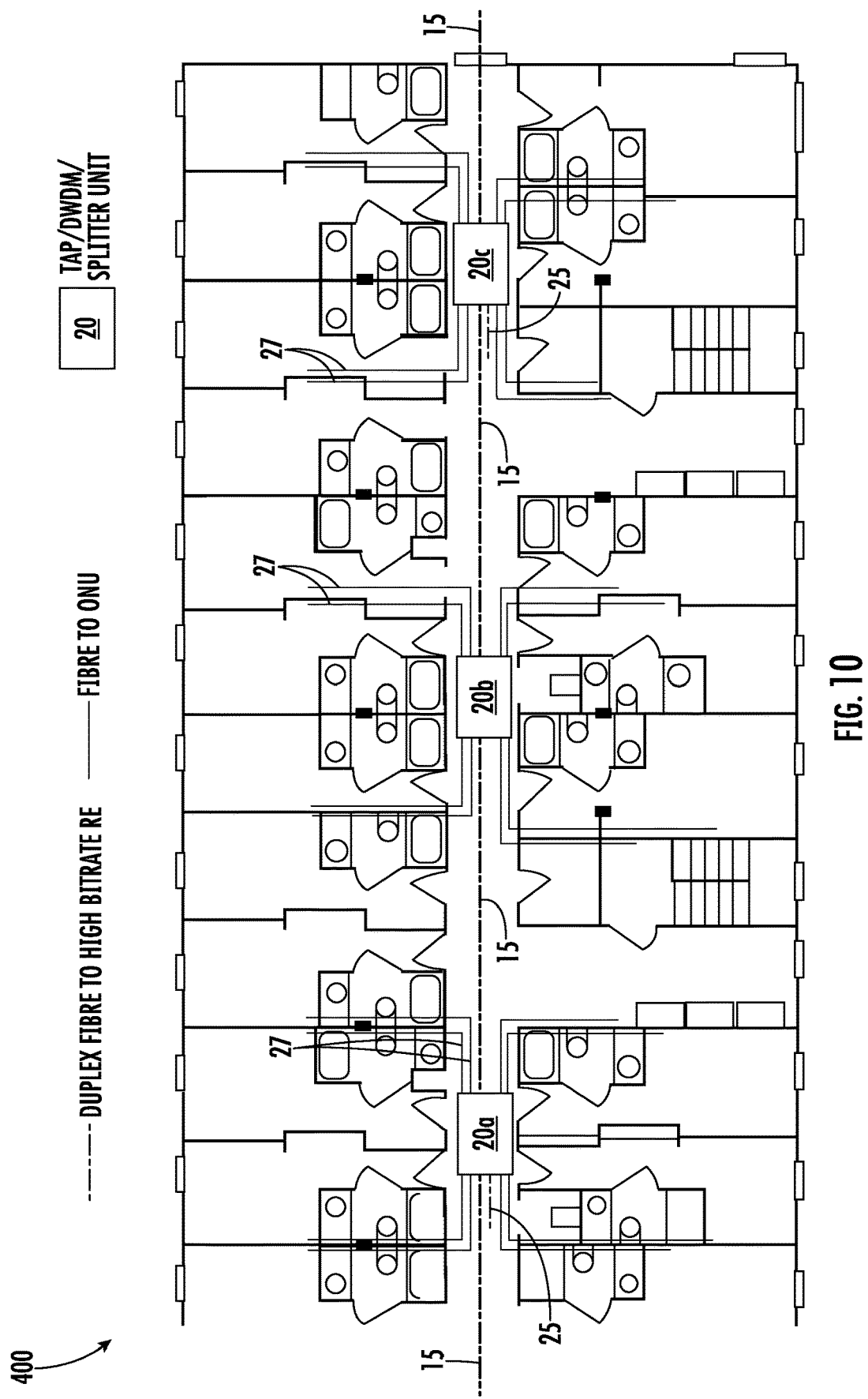

Having thus described embodiments of the present disclosure in general terms, reference will now be made to the accompanying drawings, which are not necessarily drawn to scale, and wherein:

FIG. 1 illustrates an example system for providing combined cellular and passive optical local area network (POLAN) network traffic through a single, shared fiber optic backbone to a building, in accordance with some embodiments discussed herein;

FIG. 2 illustrates an example headend unit for the system shown in FIG. 1, wherein the headend unit is configured to combine the cellular and passive optical local area network (POLAN) network traffic onto a single, shared fiber optic backbone, in accordance with some embodiments discussed herein;

FIG. 3 illustrates an example first and last fiber optic assembly unit within an example system of n fiber optic assembly units connected via a fiber optic backbone, in accordance with some embodiments discussed herein;

FIG. 4 illustrates an example fiber optic assembly unit including an asymmetric coupler, in accordance with some embodiments discussed herein;

FIG. 5 illustrates an example fiber optic assembly unit including an asymmetric coupler as well as a dense wavelength-division multiplexing (DWDM) filter providing a separate channel for cellular network traffic, in accordance with some embodiments discussed herein;

FIG. 6 illustrates an example fiber optic assembly unit including an asymmetric coupler as well as a splitter providing multiple separate channels for local area network (LAN) traffic, in accordance with some embodiments discussed herein;

FIG. 7 illustrates an example fiber optic assembly unit including multiple DWDM filters providing multiple separate channels for cellular network traffic, in accordance with some embodiments discussed herein;

FIG. 8 is a top plan view of an example system deployed within a building floor and including the fiber optic assembly unit of FIG. 5, in accordance with some embodiments discussed herein;

FIG. 9 is a top plan view of an example system deployed within a building floor and including the fiber optic assembly unit of FIG. 4, in accordance with some embodiments discussed herein; and FIG. 10 is a top plan view of an example system deployed within a building floor and including fiber optic assembly units with and without a DWDM filter, in accordance with some embodiments discussed herein.

DETAILED DESCRIPTION

Exemplary embodiments of the present disclosure will be described more fully hereinafter with reference to the accompanying drawings, in which some, but not all embodiments of the present disclosure are shown. Indeed, the present disclosure may be embodied in many different forms and should not be construed as limited to the exemplary embodiments set forth herein; rather, these embodiments are provided so that this disclosure will satisfy applicable legal requirements. Like reference numerals refer to like elements throughout.

FIG. 1 illustrates an example hybrid fiber distribution system 100, which may be installed within a communications architecture (e.g., building network). The hybrid fiber distribution system 100 may be configured to support both local area network (LAN) traffic (e.g., involving many nodes with lower bandwidth and relative insensitivity to latency) as well as delay sensitive/high-bitrate usage applications (e.g., point-to-point optical connectivity, such as cellular) (Haul (e.g., midhaul, fronthaul) traffic (e.g., requiring high bandwidth and low latency)). The converged physical structure of the system 100 may provide distribution of both time- and wavelength-division multiplexed signals while meeting the technical requirements of both forms of traffic with independent active end equipment.

The hybrid fiber distribution systems disclosed herein may advantageously bypass the 100 m limitations of a conventional copper-based LAN. Further, strict regulatory and optimization requirements within commercial deployments may include operating and space limitations that may be met by the customization of the hybrid fiber distribution system 100.

The converged infrastructure of the hybrid fiber distribution system 100 may advantageously provide materials and installation cost savings as well as simplify and reduce redundancies as compared with conventional parallel systems. Cost savings may be provided by the reduced length and number of cables required, as well as minimizing the number of enclosures needed, reducing the expense of hardware as well as labor. For example, the disclosed daisy-chain type architecture in a passive optical local area network (POLAN) may use about 75% less cable/fiber than the conventional star architecture of "home run" cables.

The generic passive optical infrastructure of the disclosed hybrid fiber distribution systems may support multiple types of communication protocols and transports (e.g., common public radio interface (CPRI), open radio access network (ORAN), Ethernet, passive optical network (PON)) and serve a variety of applications, such as LAN-based applications, WiFi, cellular (e.g., 4G or 5G using different radio access network (RAN) splits and/or architectures), etc.

The system 100 may include a headend unit 10 configured to combine various network inputs into a single fiber optic backbone 15. By combining all of the communications network signals onto a single fiber optic backbone 15 the system 100 may save on materials and installation costs. Using a single fiber optic backbone 15 (e.g., as opposed to a star topography) lowers the amount of fiber to be installed throughout the network architecture. In this regard, in some embodiments, the fiber optic backbone is a central cable pathway run through the network that enables multiple fiber optic assembly units, such as the fiber optic assembly units 20 described herein, to be connected thereto, although, in some embodiments, various branches of a central cable pathway can also be utilized downstream of the headend unit. In some embodiments, such as described herein, the fiber optic assembly units may include asymmetric couplers that set the size data signal provided to the components of the fiber optic assembly unit, thereby providing the remaining data signal to pass back into the fiber optic backbone (and be utilized by a downstream fiber optic assembly unit)—which allows for cascading connections of multiple fiber optic assembly units without downsides typically present with a daisy-chain structure.

As shown in FIG. 2, the headend unit 10 may include input ports configured to accept various network inputs. For example, the input ports of the headend unit 10 may include an optical line terminal (OLT) port 16 configured to accept an OLT plug/end.

In some embodiments, the input ports of the headend unit 10 may include one or more dense wavelength-division multiplexing (DWDM) ports 14 configured to accept conduits carrying DWDM signals. For example, the DWDM ports 14 may include a port with a transceiver (e.g., SFP28) in a high-bitrate switch (e.g., with 32×25 Gbps ports) where two different high-bitrate DWDM wavelengths may be combined onto one fiber. The number of DWDM ports 14 within the headend unit 10 may be optimized to support the number of point-to-point links required within a wired or wireless network (e.g., 4 or 8 ports), such as for a cellular network.

In order to consolidate the signals provided through the dense wavelength-division multiplexing (DWDM) ports, the headend unit 10 may include a DWDM multiplexer/demultiplexer 12 configured to combine all of the different wavelength signals being carried over different fibers into composite signals carried over one conduit. In some embodiments, the DWDM multiplexer/demultiplexer 12 may be a multiplexer that is configured to combine all of the difference wavelength signals into a single signal, such as for passing to the coexistence unit (CE) 18.

The consolidated high-bitrate DWDM signal output of the DWDM multiplexer/demultiplexer 12 may then be further combined with the signals of the OLT within the CE unit 18. The CE unit 18 may output the combined DWDM and OLT signals onto the single fiber optic backbone 15. By combining the DWDM and OLT signals onto one fiber (e.g., the fiber optic backbone 15), that single fiber may be used to connect a daisy chain of fiber optic assembly units 20 to serve both a passive optical network (PON) and a wireless or cellular network.

In some embodiments, the system 100 may include one or more enclosures with structures for mounting various communications equipment (e.g., a plurality of fiber optic tray assemblies). For example, the headend unit 10 may include vertical rails and/or slots formed therein (e.g., according to an Electronic Industries Alliance (EIA) standard) similar to an equipment rack. The headend unit 10 may further include routing channels and/or hubs for carrying and/or offsetting the weight of any cables/conduits. In some embodiments, such features may be used to ensure a suitable bend curvature (e.g., with radius of curvature greater than 25 mm or other suitable curvature based on the cable/conduit type and/or diameter) as the cable/conduit is conveyed through the headend unit 10 to connect to communications equipment and/or the fiber optic backbone 15.

As shown in FIG. 1, the system 100 may further include one or more fiber optic assembly units 20 (e.g., 20a-d) connected to the headend unit 10 via the fiber optic backbone 15. The fiber optic assembly units 20 may be connected in series (e.g., daisy-chained) along the fiber optic backbone 15. The signal power over the first section 15a of the fiber optic backbone 15 may be greater than the signal power over the second section 15b of the fiber optic backbone 15. Likewise, the signal power over the second section 15b of the fiber optic backbone 15 may be greater than the signal power over the third section 15c of the fiber optic backbone 15, which may be greater than the signal power over the fourth section 15d of the fiber optic backbone 15. The number of fiber optic assembly units 20 connected to the headend unit 10 via the fiber optic backbone 15 may be designed with this signal power drop-off in mind.

Due to the limited loss budget for the DWDM links supplying the wireless or cellular network, splicing may be preferred for the longer fiber runs of the fiber optic backbone 15 (e.g., from the headend unit 10 to the first fiber optic assembly unit 20, or between fiber optic assembly units 20). Accordingly, the enclosure for the headend unit 10 and/or fiber optic assembly unit 20 may include feedthrough ports for the transport fiber and/or splice holders. Inclusion of feedthrough ports and/or splice holders may advantageously avoid the added hardware and labor costs of a separate splice tray to hold the fusion splices.

In some embodiments, the headend unit 10 may include multiple fiber optic backbones 15, where each fiber optic backbone 15 connects to a different series of fiber optic assembly units 20. In this regard, multiple series of fiber optic assembly units 20 may share a host switch at the headend unit 10.

In some embodiments, the system 100 may include multiple headend units 10, each of which may connect to one or more series of fiber optic assembly units 20 via one or more fiber optic backbones 15.

FIG. 3 illustrates an example system 200 of a series of n fiber optic assembly units 20. The first fiber optic assembly unit 20 may receive an input fiber optic signal 21 via the first section 15a of the fiber optic backbone 15. Within the first fiber optic assembly unit 20, there may be an asymmetric coupler 22 configured to split the input fiber optic signal 21 into a throughput fiber optic signal 23 and an output fiber optic signal 29. For example, the asymmetric coupler 22 may be an asymmetric optical tap coupler with a coupling ratio of 90:10, where 90% of the signal power is routed to the throughput fiber optic signal 23 and 10% of the signal power is routed to the output fiber optic signal 29 (although other splits of signal power are contemplated). The output fiber optic signal 29 may be connected to a dense wavelength-division multiplexing (DWDM) filter 24 configured to filter a channel 25 for a wireless network from the output fiber optic signal 29. In some embodiments, the fiber optic assembly unit 20 may include just one or more DWDM filters, as the system is customizable depending on the needs of the network at the location of the fiber optic assembly unit.

Additionally or alternatively, a splitter may be provided to receive the signal from the output fiber optic signal 29 and split it into multiple passive optical network (PON) outputs for a local area network (LAN). For example, returning to FIG. 3, the output fiber optic signal 29 may be connected to a splitter 26 (shown in FIGS. 4 and 5) configured to split a wideband signal from the output fiber optic signal 29 into multiple PON outputs 27 for a LAN. Providing the LAN with optical fibers rather than copper twisted pair cabling may advantageously provide less bulky cables, no 100 m distance limitations, and/or more available bandwidth for future use without having to replace the copper cable with a higher category, for example. The throughput fiber optic signal 23 of the first fiber optic assembly unit 20 may be routed to the second section 15b of the fiber optic backbone 15 in order to provide the next fiber optic assembly unit 20 in the series of fiber optic assembly units 20 with an input fiber optic signal.

In some embodiments, the next fiber optic assembly unit in the series of fiber optic assembly units within the system 200 may include an asymmetric coupler (e.g., asymmetric 1×2 optical tap splitter) with a different coupling ratio. The different coupling ratio may be utilized in order to maintain a similar output signal power output level between the first and adjacent fiber optic assembly units 20 in the series. For example, the coupling ratio of the asymmetric coupler of the second fiber optic assembly unit in the series may be 80:20, where 80% of the signal power is routed to the throughput fiber optic signal and 20% of the signal power is routed to the output fiber optic signal. In this way, some systems 200 may provide a series of fiber optic assembly units with graduated coupling ratios for ensuring that the signal power routed to the output fiber optic signal at each fiber optic assembly unit is sufficient to support the LAN and/or cellular network traffic at each fiber optic assembly unit location within the system 200. The coupling ratio at each fiber optic assembly unit 20 in the series may incrementally increase the percentage of signal power routed to the output fiber optic signal 29 from the input fiber optic signal 21 since the signal power of the input fiber optic signal 21 decreases at each fiber optic assembly unit 20 along the fiber optic backbone 15. Many different variations of coupling ratios within each fiber optic assembly unit in the system 200 are possible. The coupling ratio of the asymmetric coupler 22 may be optimized such that the asymmetric coupler 22 taps out sufficient signal power from the fiber optic backbone 15 to serve the particular area or zone in which the fiber optic assembly unit 20 is to be located. The percentage of signal power tapped by the asymmetric coupler 22 at each fiber optic assembly unit 20 in the series may vary along the cascade to stay within the link budget.

In some embodiments, an asymmetric 1×N (e.g., where N is greater than 2) optical tap splitter may be utilized within a fiber optic assembly unit to split an input fiber optic signal 21 across more than 2 outputs (e.g., more than the output fiber optic signal 29 and the throughput fiber optic signal 23).

The nth or last fiber optic assembly unit 20n in the series of fiber optic assembly units may receive an input fiber optic signal 21n via the nth section 15n of the fiber optic backbone 15. In contrast to the first fiber optic assembly unit 20, the last fiber optic assembly unit 20n may not include an asymmetric coupler and/or a throughput fiber optic signal since the last fiber optic assembly unit 20n is the final fiber optic assembly unit in the series of the system 200. Instead, the input fiber optic signal 21n within the last fiber optic assembly unit 20n may be connected to a dense wavelength-division multiplexing (DWDM) filter 24n configured to filter a channel 25 for a wireless network from the input fiber optic signal 21. Additionally or alternatively, the input fiber optic signal 21 may be connected to a splitter configured to split a wideband signal from the input fiber optic signal 21 into one or more passive optical network (PON) outputs for a local area network (LAN). In this way, the DWDM filter 24n and/or the splitter may receive 100% of the signal power from the input fiber optic signal 21n. The DWDM filter 24n may be configured to provide an output fiber optic signal 29n that can be further connected to a splitter configured to split a wideband signal from the output fiber optic signal 29n into one or more PON outputs for a LAN.

Alternatively, in some embodiments, each fiber optic assembly unit in the series of fiber optic assembly units may be an identically configured standard building block fiber optic assembly unit. In some such embodiments, however, the last fiber optic assembly unit 20n in the system 200 may still not have a throughput fiber optic signal that connects to anything (although this configuration may not be necessary for all networks). Additionally or alternatively, in some embodiments, the fiber optic assembly units may include an additional port for the input fiber optic signal 21 of the nth section 15n of the fiber optic backbone 15 that connects directly to a dense wavelength-division multiplexing (DWDM) filter 24 and/or a splitter 26, bypassing the asymmetric coupler 22. In some embodiments, the fiber optic assembly units may include three separate ports for receiving an input fiber optic signal 21 from the fiber optic backbone 15: a first port that connects directly to the asymmetric coupler 22, a second port that connects directly to the DWDM filter 24, and a third port that connects directly to the splitter 26. Other configurations are possible.

In some embodiments, the fiber optic assembly unit may include switches and/or other optical connector communications equipment for easily changing the configuration of the internal connections. In this way, an installer may customize the network layout for a particular area (e.g., building floor) using the same standard building block fiber optic assembly units without having to provide multiple different fiber optic assembly unit configurations. Standard, dynamically configurable fiber optic assembly units may allow for lower production and logistical costs.

FIG. 4 illustrates an example fiber optic assembly unit 20 configured to receive an input fiber optic signal 21 via a fiber optic backbone 15. The fiber optic assembly unit 20 may include an asymmetric coupler 22 configured to split the input fiber optic signal 21 into a throughput fiber optic signal 23 and an output fiber optic signal 29. The throughput fiber optic signal 23 of the fiber optic assembly unit 20 may be output to a continuation section 15' of the fiber optic backbone 15. The signal power of the throughput fiber optic signal 23 may be optimized by varying the coupling ratio of the asymmetric coupler 22, such as within a range of 99:1-1:99 (e.g., within a range of 90:10 to 50:50). The illustrated example indicates a 90:10 coupling ratio.

The output fiber optic signal 29 may be connected to a first dense wavelength-division multiplexing (DWDM) filter 24a and a second dense wavelength-division multiplexing (DWDM) filter 24b configured to filter out two channels for a first network (e.g., wired or wireless network (e.g., WiFi 6, small cell 5G wireless)) from the output fiber optic signal 29. For example, the first DWDM filter 24a may filter out a first DWDM channel with a first wavelength (e.g., $\lambda_y$), and the second DWDM filter 24b may filter out a second DWDM channel with a second wavelength (e.g., $\lambda_x$). In this way, the second DWDM filter 24b may output a wideband signal 31 containing all the wavelengths from the output fiber optic signal 29 except the first and second wavelengths (e.g., $\lambda_y$ and $\lambda_x$) that were filtered out for the two DWDM channels. In some embodiments, the first and second wavelengths (e.g., $\lambda_y$ and $\lambda_x$) may be in the RF Video band (e.g., ~1550 nm). Use of the RF Video band may be advantageous in networks not utilizing the RF Video band such as in a hospitality environment, where the television signal is provided by IPTV. By using the RF Video band, the DWDM channels may act as an overlay within a passive optical network (PON).

The two DWDM channels may be provided on two DWDM output fibers 25 (although a single DWDM output fiber is shown). The DWDM output fibers 25 may be connected to a preconnectorized jumper (e.g., with a duplex LC connector) for connecting to a DWDM transceiver or transponder (e.g., software-tunable transceiver module). The DWDM transceiver or transponder may be configured to convert optical signals over the DWDM channels into electrical signals (and vice versa), in order to interface with remote equipment (RE) (e.g., active access wireless device) within the cellular or wireless network.

As shown in FIG. 4, the DWDM transceivers may be built into the fiber optic assembly unit 20, in which case the DWDM output fibers 25 may be provided over any medium connected to the corresponding DWDM transceiver.

In some embodiments, instead of two cascaded DWDM filters 24a, 24b, each filtering out a DWDM channel, the fiber optic assembly unit 20 may include a DWDM filter 24 configured with a wider filter (e.g., two channels wide) to filter out 2 adjacent DWDM channels (e.g., $\lambda_y$ and $\lambda_x$) at once. The two DWDM channels may be provided on a single DWDM output fiber 25. The DWDM output fiber 25 (e.g., carrying both downlink and uplink traffic) may be connected to a preconnectorized jumper (e.g., with a simplex LC connector) for connecting to a bidirectional DWDM transceiver, configured to convert optical signals over the DWDM channels into electrical signals (and vice versa), in order to interface with remote equipment (RE) (e.g., active wireless access device) within the network. In some embodiments, the active wireless access device is at least one of a small cell 4G transceiver, a small cell 5G transceiver, 5G non-standalone, a remote radio head, and a WiFi access point. In some embodiments, the active wireless access device utilizes at least one of a CPRI interface or ORAN interface.

Downstream from the first and second DWDM filters 24a, 24b, the wideband signal 31 may be connected to a splitter 26 (e.g., a planar lightwave circuit (PLC) splitter) configured to split the wideband signal 31 into multiple passive optical network (PON) output fibers 27 (e.g., using a point-to-multipoint network architecture with a PON standard, such as GPON, EPON, APON, 10G-PON, 10G-EPON, SPON) for a local area network (LAN). As shown in FIG. 4, the splitter 26 may be a 1×4 splitter (e.g., a 1×4 symmetric optical coupler configured to provide 25% of the signal power among 4 output fibers) that divides the wideband signal 31 optically among four PON output fibers 27a, 27b, 27c, 27d. Each of the four PON output fibers 27a, 27b, 27c, 27d may be connected to a preconnectorized jumper (e.g., with an SC connector) for connecting to a PON transceiver (e.g., SFP transceiver), configured to convert optical signals into electrical signals (and vice versa), in order to interface with an end device, such as an optical network terminal (ONT). The four PON output fibers 27a, 27b, 27c, 27d may be shorter fibers as compared to the fiber lengths used in a star architecture, since the fiber optic assembly units 20 are daisy-chained along the fiber optic backbone 15. Using shorter fibers and only splitting off from the fiber optic backbone 15 where needed may save on materials and/or installation costs.

Each ONT may be coupled with one or more peripheral devices (e.g., computer, printer, server, camera, access-control, smart meters, smart appliances). For example, each ONT may support a different number of copper-based LAN ports (e.g., 4 Ethernet ports). An ONT may support an access point (AP), such as a WiFi router within the LAN. In some embodiments, the ONT may be incorporated directly into a peripheral device, such as a network interface card (e.g., via Ethernet) and/or proprietary connector (e.g., small form-factor pluggable (SFP) transceiver).

Downstream signals for the LAN may be provided in a continuous mode (e.g., at ~1490 nm) to the PON transceiver, where upstream signals from the LAN may be transmitted (e.g., at ~1310 nm) from the PON transceiver across four timeslots (e.g., via time-division multiplexing (TDM)) allocated to each of the four ONTs to avoid interference at the splitter 26 when the upstream data signals are recombined (e.g., as a composite signal) onto a single fiber. The PON transceiver may convert the optical data signal into an electrical signal to be passed to a peripheral device and vice versa. Accordingly, the PON transceiver may both transmit and receive optical and electrical data signals. The PON transceiver may utilize different form factors, such as a bidirectional sub-assembly (BOSA) and/or other laser assemblies, for example. The PON transceiver chosen may affect the fiber connections available for the PON output fibers 27. For example, the PON output fibers 27 may include single mode bidirectional fiber, multimode fiber, and/or duplex connectors with separate transmission paths for uplink and downlink.

As shown in FIG. 4, the PON transceivers may be built into the fiber optic assembly unit 20, in which case the PON outputs 27a, 27b, 27c, 27d may be provided over any medium connected to the corresponding PON transceiver.

In some embodiments, the fiber optic assembly unit 20 may include an enclosure with structures for mounting various communications equipment (e.g., a plurality of fiber optic tray assemblies). For example, the enclosure for a fiber optic assembly unit 20 may include splicing and/or splitting modules (e.g., module 28 in FIG. 6) and fiber storage areas within the enclosure for setting up connections to an input fiber for carrying the input fiber optic signal 21 and an output fiber for carrying the throughput fiber optic signal 23. Additionally or alternatively, the enclosure may include standard ports (e.g., SC, duplex LC) and/or preconnectorized cables for easily connecting the input fiber optic signal 21 and throughput fiber optic signal 23 to the fiber optic backbone 15 between fiber optic assembly units 20 in the series of the system. In some embodiments, the enclosure may be a standard enclosure (e.g., Corning SPH-01P) such that the series of fiber optic assembly units 20 may easily work with standard accessories and/or spacing.

In some embodiments, the fiber optic assembly unit may include both permanent (e.g., non-accessible) and dynamic (e.g., accessible) parts. For example, an asymmetric coupler 22, two DWDM filters 24, and a splitter 26 may be spliced together and installed into a standard enclosure as a permanent part of the fiber optic assembly unit. The permanent part of the fiber optic assembly unit may include an input fiber port for carrying the input fiber optic signal 21 and an output fiber port for carrying the throughput fiber optic signal 23. In some embodiments, the permanent part of the fiber optic assembly unit may additionally or alternatively include preconnectorized low-cost jumpers configured to connect the DWDM and PON output fibers 25, 27 to transceivers and/or end equipment (e.g., RE, ONT). During installation, the input fiber port and output fiber port can be spliced to the fiber optic backbone 15 within the dynamic part of the fiber optic assembly unit.

Using preconnectorized jumpers and/or permanent input and output fiber ports may minimize the number of connections required, whether connectors or splices, thereby reducing labor costs as well as the number of units requiring installation space. Advantageously, the combined functions of the equipment in the permanent part may lower hardware costs and installation time, as well as reduce optical loss that may otherwise result from additional connectors.

FIG. 5 illustrates another example fiber optic assembly unit 20' configured to receive an input fiber optic signal 21 via a fiber optic backbone 15. Similar to the fiber optic assembly unit 20 of FIG. 4, the fiber optic assembly unit 20' includes an asymmetric coupler 22 that splits the input fiber optic signal 21 into a throughput fiber optic signal 23 routed back to the fiber optic backbone 15 and an output fiber optic signal 29 routed to two DWDM filters that filters out two DWDM channels to a DWDM output fiber 25 for a cellular or wireless network. The DWDM output fiber 25 may connect with a DWDM transceiver (e.g., 25 Gbps SFP28 transceiver) which converts the optical signals of the two DWDM channels into electrical signals (and vice versa) for interfacing with remote equipment (RE) 32 within the wireless or cellular network. In some embodiments, the first DWDM channel may be used for downlink, and the second DWDM channel may be used for uplink.

As shown in FIG. 5, the DWDM transceivers may be built into the fiber optic assembly unit 20, in which case the DWDM output fibers 25 may be provided over any medium connected to the corresponding DWDM transceiver.

Downstream from the first and second DWDM filters 24a, 24b, the wideband signal 31 may be connected to a splitter 26' (e.g., a planar lightwave circuit (PLC) splitter) configured to split the wideband signal 31 into multiple passive optical network (PON) output fibers 27 for a local area network (LAN). As shown in FIG. 5, the splitter 26' may be a 1×8 splitter (e.g., a 1×8 symmetric optical coupler configured to provide 12.5% of the signal power among 8 output fibers) that divides the wideband signal 31 optically among eight PON output fibers 27. Each of the eight PON output fibers 27 may be connected to a preconnectorized jumper (e.g., with an SC connector) for connecting to a PON transceiver, configured to convert optical signals into electrical signals (and vice versa), in order to interface with an end device (e.g., ONT 34). Downstream signals for the LAN may be provided in a continuous mode (e.g., at ~1490 nm) to the PON transceivers, where upstream signals from the LAN may be transmitted (e.g., at ~1310 nm) from the PON transceivers across eight timeslots (e.g., via time-division multiplexing (TDM)) allocated to each of the eight ONTs to avoid interference at the splitter 26' when the upstream data signals are recombined onto a single fiber.

As shown in FIG. 5, the PON transceivers may be built into the fiber optic assembly unit 20', in which case the PON outputs 27 may be provided over any medium connected to the corresponding PON transceiver.

The 1×8 splitter 26' within the fiber optic assembly unit 20' of FIG. 5 may provide a LAN with a higher LAN port density. For example, the higher LAN port density may be utilized within a hotel building (e.g., where each door lock is connected to the LAN).

The ratio of LAN nodes to RE nodes (e.g., point-to-point high bitrate/low latency cellular nodes) may vary. Multiple versions (e.g., 1×4 and 1×8 splitter) of the fiber optic assembly units may be offered in order to support varying requirements. Additionally, where a larger number of LAN nodes relative to RE nodes, versions of the fiber optic assembly unit without DWDM filters for RE nodes can be provided that only support LAN nodes. Likewise, the fiber optic assembly units may be provided in configurations without a splitter 26, 26' such that the unit only supports RE nodes. Each version of the fiber optic assembly units 20 with a different configuration may be provided as part of a product family, having the same form factor and design. This may advantageously provide flexibility of system configurations while allowing for seamless swapping and uniform aesthetics.

FIG. 6 illustrates another example fiber optic assembly unit 20" configured to receive an input fiber optic signal 21 via a fiber optic backbone 15. Similar to the fiber optic assembly units 20, 20' of FIGS. 4-5, respectively, the fiber optic assembly unit 20" includes an asymmetric coupler 22 that splits the input fiber optic signal 21 into a throughput fiber optic signal 23 routed back to the fiber optic backbone

15 and an output fiber optic signal 29. The output fiber optic signal 29 may be routed to a splitter 26" (e.g., a planar lightwave circuit (PLC) splitter) configured to split the output fiber optic signal 29 into multiple PON output fibers 27 for a LAN. As shown in FIG. 6, the splitter 26" may be a 1×32 splitter (e.g., a 1×32 symmetric optical coupler configured to provide 3.125% of the signal power among 32 output fibers) that divides the output fiber optic signal 29 optically among thirty-two PON output fibers 27. Each of the thirty-two PON output fibers 27 may be connected to a preconnectorized jumper (e.g., with an SC connector) for connecting to a PON transceiver, configured to convert optical signals into electrical signals (and vice versa), in order to interface with an end device (e.g., ONT) within the LAN. Downstream signals for the LAN may be provided in a continuous mode (e.g., at ~1490 nm) to the PON transceivers, where upstream signals from the LAN may be transmitted (e.g., at ~1310 nm) from the PON transceivers across thirty-two timeslots (e.g., via time-division multiplexing (TDM)) allocated to each of the thirty-two ONTs to avoid interference at the splitter 26" when the upstream data signals are recombined onto a single fiber.

As shown in FIG. 6, the PON transceivers may be built into the fiber optic assembly unit 20", in which case the PON outputs 27 may be provided over any medium connected to the corresponding PON transceiver.

The 1×32 splitter 26" within the fiber optic assembly unit 20" of FIG. 6 may provide a LAN with a higher LAN port density. For example, the higher LAN port density may be utilized within a hotel building (e.g., where each door lock is connected to the LAN). Further, the fiber optic assembly unit 20" of FIG. 6 may be used within a system that includes a lower remote equipment (RE) density (e.g., where one or more other fiber optic assembly units 20" within the system include DWDM filters 24 for connecting to RE such as wireless access devices that supply 5G wireless signals to an entire floor). Moreover, the cost of manufacturing the fiber optic assembly units 20" of FIG. 6 may be lower due to the savings in not including a DWDM filter.

FIG. 7 illustrates another example fiber optic assembly unit 20''' configured to receive an input fiber optic signal 21 via a fiber optic backbone 15. Similar to the fiber optic assembly units 20, 20', 20" of FIGS. 4-6, the fiber optic assembly unit 20''' includes an asymmetric coupler 22 that splits the input fiber optic signal 21 into a throughput fiber optic signal 23 routed back to the fiber optic backbone 15 and an output fiber optic signal 29. The output fiber optic signal 29 may be routed to a first dense wavelength-division multiplexing (DWDM) filter 24a, a second DWDM filter 24b, a third DWDM filter 24c, and a fourth DWDM filter 24d configured to filter out four channels for a cellular or wireless network (e.g., WiFi 6, small cell 5G wireless) from the output fiber optic signal 29. For example, the first DWDM filter 24a may filter out a first DWDM channel with a first wavelength (e.g., $\lambda_g$), the second DWDM filter 24b may filter out a second DWDM channel with a second wavelength (e.g., $\lambda_z$), the third DWDM filter 24c may filter out a third DWDM channel with a third wavelength (e.g., $\lambda_y$), and the fourth DWDM filter 24d may filter out a fourth DWDM channel with a fourth wavelength (e.g., $\lambda_x$). In this way, for example, the first and second wavelengths (e.g., $\lambda_g$ and $\lambda_z$) may be filtered out into two DWDM channels for a 4G small cell network, while the third and fourth wavelengths (e.g., $\lambda_y$ and $\lambda_x$) may be filtered out into two DWDM channels for a 5G DAS unit network. Using multiple DWDM filters 24a, 24b, 24c, 24d within the fiber optic assembly unit 20''' of FIG. 7 may provide multiple types of cellular or wireless networks (e.g., 4G, 5G, WiFi 6) with a higher remote equipment (RE) density. Additionally or alternatively, multiple DWDM filters may advantageously allow multiple cellular or wireless carriers or service providers to utilize the same fiber optic backbone 15. Further, the fiber optic assembly unit 20''' of FIG. 7 may be used within a system that includes one or more other fiber optic assembly units 20, 20', 20" with splitters 26 for connecting to ONTs within a LAN.

FIG. 8 illustrates an example system 300 of multiple fiber optic assembly units 20 with the same configuration connected via a shared fiber optic backbone 15. As shown in FIG. 8, each fiber optic assembly unit 20 may include eight passive optical network (PON) outputs 27 configured to connect with PON transceivers and/or ONTs in the LAN as well as a DWDM output fiber 25 (e.g., duplex fiber) configured to provide symmetric uplink and downlink DWDM channels for a RE node within the wireless or cellular network. The system 300 of FIG. 8 may be used, for example, within a hotel floor or other environment with a higher LAN port density. Due to the small physical structure of the fiber optic assembly units 20 in the system 300 of FIG. 8, the fiber optic assembly units 20 may be installed to sit on or adjacent the raceway above the ceiling, and preconnectorized patch cords may lead to relevant points in the hallway and rooms, for example.

FIG. 9 illustrates an example system 300' of multiple fiber optic assembly units 20 with the same configuration connected via a shared fiber optic backbone 15. As shown in FIG. 9, each fiber optic assembly unit 20 may include four passive optical network (PON) outputs 27 configured to connect with PON transceivers and/or ONTs in the LAN as well as a DWDM output fiber 25 (e.g., duplex fiber) configured to provide symmetric uplink and downlink DWDM channels for a RE node within the wireless or cellular network. The system 300' of FIG. 9 may be used within an environment requiring a lower LAN port density, for example. In this way, there may be less signal power sharing, and thus more bandwidth available per node.

FIG. 10 illustrates an example system 400 of multiple fiber optic assembly units 20a, 20b, 20c of different configurations connected via a shared fiber optic backbone 15. As shown in FIG. 10, the first fiber optic assembly unit 20a may include eight passive optical network (PON) outputs 27 configured to connect with PON transceivers and/or ONTs in the LAN as well as a DWDM output fiber 25 (e.g., duplex fiber) configured to provide symmetric uplink and downlink DWDM channels for a RE node within the wireless or cellular network. The second fiber optic assembly unit 20b within the system 400 may include eight PON outputs 27 configured to connect with PON transceivers and/or ONTs, but without DWDM filters (e.g., like the fiber optic assembly unit 20" of FIG. 6) or support for RE. Finally, the third fiber optic assembly unit 20c within the system 400 may include eight PON outputs 27 configured to connect with PON transceivers and/or ONTs in the LAN as well as a DWDM output fiber 25 (e.g., duplex fiber) configured to provide symmetric uplink and downlink DWDM channels for a RE node within the wireless or cellular network. The system 400 of FIG. 10 may be used within an environment requiring a lower RE density, for example. The lower RE density may aid in preventing wireless interference and/or cellular latencies.

As illustrated in various configurations of FIGS. 3-10, in some embodiments, different configurations of envisioned systems and fiber optic assembly units can be utilized. This may include different splitter options, different DWDM filter options, different asymmetrical coupler options, etc. For example, the number of DWDM filters 24 may range from 0 to 16, and the number of ONT ports supported by symmetrically dividing the output fiber optic signal 29 via the splitter 26 may range from 0 to 64. Other elements may vary as well, such as the presence of an asymmetric coupler 22, its coupling ratio, the order of the DWDM filters 24 and/or splitter 26, the type of conduits, ports, and/or connectors, etc.

In some embodiments, the number of fiber optic assembly units 20 in a series may be optimized according to the particular use case and/or loss budget available.

In some embodiments, the hybrid fiber distribution systems of one or more headend units 10 in connection with one or more series of fiber optic assembly units 20 may utilize optical amplifiers. For example, using an erbium doped fiber amplifier (EDFA) at or near one or more headend units 10 may help overcome a borderline loss budget, increase the optical signal range for the fiber optic backbone 15 and/or DWDM output fibers 25, 27 to the LAN and/or cellular networks, enable support of a greater number of fiber optic assembly units 20 in a series, and/or enable support for a greater number of ONT and/or RE nodes per fiber optic assembly unit 20.

In addition to the example building networks (e.g., enterprise and hospitality environments) described above, the ports from the splitter 26 may be connected to a PON transceiver and used to extend fiber optic communications services to a subscriber. In this regard, fiber optic networks may deliver "fiber-to-the-curb" (FTTC), "fiber-to-the-business" (FTTB), "fiber-to-the-home" (FTTH) and "fiber-to-the-premises" (FTTP), referred to generically as "FTTx". For example, delivering services to subscribers in the last mile connection may occur indoors and/or outdoors. Different kinds of buildings may utilize many separate cables, each one connecting one subscriber to a main distribution point (e.g., either the headend unit 10 or the fiber optic assembly unit 20 arranged in the basement or elsewhere in the building). Each connection may require a different length of cable, so, in some embodiments, the enclosure of the headend unit 10 and/or fiber optic assembly unit 20 may include various lengths of cable or fiber (e.g., spooled) for initial installation of the system and/or modifications thereafter (e.g., due to building or subscriber changes).

For example, outdoor FTTH systems (e.g., with outdoor fiber optic communications equipment enclosures) that support broadband home services (and even backhaul traffic for some cellular networks) may be sensitive to the length of cables of fibers used, since they may have to travel farther lengths as compared with indoor systems. Having to install additional enclosures for a separate wireless or cellular communications system in an outdoor FTTH area may not be possible due to space and location limitations. Further, the existing outdoor FTTH PON systems may not be able to support increasing demands for higher bandwidth and lower latency along with higher node densities for wireless or cellular networks (e.g., 5G). To solve these issues, the systems and/or assemblies of the present disclosure may be retrofit into the existing FTTH distributed tap architecture by replacing the tap units already in place with the combined asymmetric coupler, DWDM filter, and/or PON splitter assemblies. By retrofitting outdoor FTTH systems using these hybrid fiber distribution assemblies, the upgraded FTTH systems may effectively offer high-bandwidth, low-latency point-to-point communication links to cellular network nodes or sites as a DWDM overlay on the same FTTH fiber without having to incur the cost of installing new point-to-point links. Instead, the upgraded FTTH system may advantageously utilize the same form factor already in place. In addition to retrofitting, new (e.g., greenfield) outdoor FTTH installations may utilize the systems and assemblies of the present disclosure, which may advantageously save space, aesthetics, and installation/materials costs.

CONCLUSION

Many modifications and other embodiments of the disclosures set forth herein will come to mind to one skilled in the art to which these present disclosures pertain having the benefit of the teachings presented in the foregoing descriptions and the associated drawings. Therefore, it is to be understood that the embodiments of the present disclosure are not to be limited to the specific embodiments disclosed and that modifications and other embodiments are intended to be included within the scope of the present disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the present disclosure. In this regard, for example, different combinations of elements and/or functions than those explicitly described above are also contemplated within the scope of the present disclosure. Although specific terms are employed herein, they are used in a generic and descriptive sense only and not for purposes of limitation.

The invention claimed is:

1. A system comprising:
   a headend unit configured to combine inputs into a single fiber optic backbone, the headend unit including:
   at least one optical line terminal (OLT) port,
   one or more dense wavelength-division multiplexing (DWDM) ports, and
   a multiplexer; and
   a plurality of fiber optic assembly units connected in series by the fiber optic backbone, wherein at least one of the plurality of fiber optic assembly units includes:
   an asymmetric coupler configured to split an input fiber optic signal into a throughput fiber optic signal and an output fiber optic signal comprising a channel for a first network and a wideband signal for a second network different from the first network;
   wherein the throughput fiber optic signal from the one of the plurality of fiber optic assembly units is routed as the input fiber optic signal to a next one of the plurality of fiber optic assembly units in the series via the fiber optic backbone.

2. The system of claim 1, wherein the at least one of the plurality of fiber optic assembly units further includes:
   a DWDM filter configured to filter the channel for the first network from the output fiber optic signal.

3. The system of claim 2, wherein the at least one of the plurality of fiber optic assembly units further includes:
   a splitter configured to split the wideband signal from the output fiber optic signal into a plurality of passive optical network (PON) outputs for the second network.

4. The system of claim 2, wherein the at least one of the plurality of fiber optic assembly units further includes:
   a second DWDM filter configured to filter a second channel for the first network from the output fiber optic signal.

5. The system of claim 1, wherein the asymmetric coupler of a first of the plurality of fiber optic assembly units in the series has a coupling ratio within a range of 90:10 to 50:50.

6. A system comprising:
a plurality of fiber optic assembly units connected in series by a fiber optic backbone, wherein at least one of the plurality of fiber optic assembly units includes:
an asymmetric coupler configured to split an input fiber optic signal into a throughput fiber optic signal and an output fiber optic signal comprising a channel for a first network and a wideband signal for a second network different from the first network,
a dense wavelength-division multiplexing (DWDM) filter configured to filter the channel for the first network from the output fiber optic signal, and
a splitter configured to split the wideband signal from the output fiber optic signal into a plurality of passive optical network (PON) outputs for the second network,
wherein the throughput fiber optic signal from the one of the plurality of fiber optic assembly units is routed as the input fiber optic signal to a next one of the plurality of fiber optic assembly units in the series via the fiber optic backbone.

7. The system of claim 6, wherein the at least one of the plurality of fiber optic assembly units further includes:
a second DWDM filter configured to filter a second channel for the first network from the output fiber optic signal.

8. The system of claim 7, wherein the second channel for the first network from the output fiber optic signal is configured for uplink.

9. The system of claim 6, wherein the at least one of the plurality of fiber optic assembly units comprises an enclosure including the asymmetric coupler, the DWDM filter, the splitter, and splices.

10. The system of claim 6, wherein the at least one of the plurality of fiber optic assembly units further comprises preconnectorized jumpers configured to connect with active equipment.

11. The system of claim 6, wherein the channel for the first network from the output fiber optic signal is configured for an active wireless access device.

12. The system of claim 11, wherein the active wireless access device is at least one of a small cell 4G transceiver, a small cell 5G transceiver, 5G non-standalone, a remote radio head, and a WiFi access point.

13. The system of claim 11, wherein the active wireless access device is configured to use at least one of a CPRI interface and an ORAN interface.

14. The system of claim 6, wherein the splitter is at least one of a 1×4 output splitter, a 1×8 output splitter, a 1×16 output splitter, and a 1×32 output splitter.

15. The system of claim 6, wherein the splitter is connected to the output fiber optic signal downstream of the DWDM filter connected to the output fiber optic signal.

16. The system of claim 6, further comprising:
a headend unit configured to combine inputs into the fiber optic backbone before connecting to a first of the plurality of fiber optic assembly units, the headend unit including:
at least one optical line terminal (OLT) port,
one or more DWDM ports, and
a multiplexer.

17. The system of claim 6, further comprising:
an additional fiber optic assembly unit connected to the fiber optic backbone after a final one of the plurality of fiber optic assembly units, the additional fiber optic assembly unit including at least one of:
an additional fiber optic assembly unit DWDM filter configured to filter a second channel for the first network from an input fiber optic signal; and
an additional fiber optic assembly unit splitter configured to split the wideband signal from the input fiber optic signal into a plurality of passive optical network (PON) outputs for the second network.

18. A fiber optic assembly unit enabling hybrid distribution of time-division multiplexing (TDM) and wavelength-division multiplexing (WDM), the fiber optic assembly unit comprising:
an asymmetric coupler configured to split an input fiber optic signal into a throughput fiber optic signal and an output fiber optic signal comprising a channel for a first network and a wideband signal for a second network different from the first network;
a dense wavelength-division multiplexing (DWDM) filter configured to filter the channel for the first network from the output fiber optic signal; and
a splitter configured to split the wideband signal from the output fiber optic signal into a plurality of passive optical network (PON) outputs for the second network.

19. The fiber optic assembly unit of claim 18, further comprising an enclosure including the asymmetric coupler, the DWDM filter, the splitter, and a splicing module.

20. The fiber optic assembly unit of claim 18, further comprising preconnectorized jumpers configured to connect with active equipment.

21. The fiber optic assembly unit of claim 18, wherein the splitter is connected to the output fiber optic signal downstream of the DWDM filter connected to the output fiber optic signal.

* * * * *